United States Patent
Moradell-Casellas

(10) Patent No.: US 10,458,363 B2
(45) Date of Patent: Oct. 29, 2019

(54) THRUST REVERSER FOR A NACELLE OF AN AIRCRAFT TURBOJET ENGINE

(71) Applicant: Safran Nacelles, Gonfreville l'Orcher (FR)

(72) Inventor: Pierre Moradell-Casellas, Saint Georges des Groseillers (FR)

(73) Assignee: Safran Nacelles, Gonfreville l'Orcher (FR)

( * ) Notice: Subject to any disclaimer, the term of this patent is extended or adjusted under 35 U.S.C. 154(b) by 199 days.

(21) Appl. No.: 15/823,619

(22) Filed: Nov. 28, 2017

(65) Prior Publication Data

US 2018/0080409 A1   Mar. 22, 2018

Related U.S. Application Data

(63) Continuation of application No. PCT/FR2016/051313, filed on Jun. 2, 2016.

(30) Foreign Application Priority Data

Jun. 2, 2015 (FR) ..................................... 15 55008

(51) Int. Cl.
| | |
|---|---|
| *F02K 1/72* | (2006.01) |
| *B64D 33/04* | (2006.01) |
| *F02K 1/12* | (2006.01) |
| *F02K 1/76* | (2006.01) |

(52) U.S. Cl.
CPC ................ *F02K 1/72* (2013.01); *B64D 33/04* (2013.01); *F02K 1/12* (2013.01); *F02K 1/1261* (2013.01); *F02K 1/766* (2013.01); *F05D 2260/50* (2013.01)

(58) Field of Classification Search
CPC .......... F02K 1/72; F02K 1/1261; F02K 1/766; F02K 1/12; F02K 1/763; B64D 33/04; F05D 2260/50; F01K 1/12; F01K 1/1261
See application file for complete search history.

(56) References Cited

U.S. PATENT DOCUMENTS

| | | | | |
|---|---|---|---|---|
| 6,021,636 A | * | 2/2000 | Johnson | .............. E05B 47/0603 244/110 B |
| 6,688,098 B2 | * | 2/2004 | Rouyer | ................... F02K 1/766 239/265.19 |
| 2003/0218094 A1 | | 11/2003 | Lair | |

FOREIGN PATENT DOCUMENTS

| | | |
|---|---|---|
| FR | 2929998 | 10/2009 |
| FR | 2934326 | 1/2010 |
| FR | 2991670 | 12/2013 |

OTHER PUBLICATIONS

International Search Report for International Application PCT/FR2016/051313, dated Sep. 21, 2016.

* cited by examiner

*Primary Examiner* — Richard R. Green
*Assistant Examiner* — Vicente Rodriguez
(74) *Attorney, Agent, or Firm* — Burris Law, PLLC

(57) ABSTRACT

A thrust reverser for a nacelle of an aircraft turbojet engine is provided that includes a thrust reverser cowl movable along a direction parallel to a longitudinal axis of the nacelle and a variable section outlet nozzle extending from the thrust reverser cowl. The thrust reverser further includes an actuator, a first locking device to lock the thrust reverser cowl, a second locking device to lock the variable section outlet nozzle, and a reset lever. The reset lever is pivotally driven by a locking pin secured to the cowl and pivots from a rest position to a reset position.

10 Claims, 5 Drawing Sheets

THRUST REVERSER FOR A NACELLE OF AN AIRCRAFT TURBOJET ENGINE

CROSS-REFERENCE TO RELATED APPLICATIONS

This application is a continuation of International Application No. PCT/FR2016/051313, filed on Jun. 2, 2016, which claims priority to and the benefit of FR 15/55008 filed on Jun. 2, 2015. The disclosures of the above applications are incorporated herein by reference.

FIELD

The present disclosure relates to a thrust reverser for a nacelle of an aircraft turbojet engine, and more particularly, to the coupling of a thrust reverser for a nacelle of an aircraft turbojet engine on an associated variable-section nozzle.

BACKGROUND

The statements in this section merely provide background information related to the present disclosure and may not constitute prior art.

An aircraft is moved by several turbojet engines each housed in a nacelle accommodating an assembly of auxiliary actuating devices relating to its operation and ensuring various functions when the turbojet engine is in operation or shut-down.

In particular, these auxiliary actuating devices comprise a mechanical thrust reverser system.

In general, a turbojet engine nacelle presents a substantially tubular structure comprising an air inlet upstream of the turbojet engine, a mid-section intended to surround a fan of said turbojet engine, a downstream section intended to surround the combustion chamber of the turbojet engine and possibly integrating thrust reversal means, and is generally terminated by an ejection nozzle whose outlet is located downstream of the turbojet engine.

Modern nacelles are intended to accommodate a bypass turbojet engine capable of generating via the blades of the rotating fan a hot air flow (primary flow) and a cold air flow (secondary flow) which circulates outside the turbojet engine through an annular passage, also called flow path, formed between a fairing of the turbojet engine and an inner wall of the nacelle. The two air flows are ejected from the turbojet engine from the rear of the nacelle.

The role of a thrust reverser, during the landing of an aircraft, is to improve the braking capability of said aircraft by redirecting forwards at least one portion of the air ejected from the turbojet engine. In this phase, the thrust reverser obstructs at least one portion of the flow path of the cold flow and directs this flow forwardly of the nacelle, thereby generating a counter-thrust which is added to the braking of the wheels and air brakes of the aircraft.

In general, the structure of a thrust reverser comprises a thrust reverser cowl displaceable between, on the one hand, a reverse jet position in which it opens in the nacelle a passage intended for the diverted air flow, and on the other hand, a direct jet position in which it closes this passage.

Besides being involved in a thrust reversal function, by belonging to the rear section of the nacelle, a thrust reverser movable cowl includes de facto a downstream portion forming the ejection nozzle.

The section of the ejection nozzle may be adapted according to the different flight phases, namely in particular the take-off, the climb, the cruise, the descent and the landing in order to always preserve an optimum nozzle section depending on the operating speed of the turbojet engine. The nozzle will be then called variable nozzle.

Such a variable nozzle is associated to an actuation system allowing this section variation.

There are several solutions to make a variable nozzle.

A first solution is to provide pivoting terminal flaps mounted on the movable thrust reverser cowl and whose pivoting results in an increase or a reduction of the outlet section. Such a system is described in particular in the documents FR 2 929 998 and FR 2 934 326.

There are also known panels movably mounted in translation inside the movable thrust reverser cowl, in a telescopic manner, whose retreat or retraction similarly results in the increase or the reduction of the outlet section.

In the context of a thrust reverser provided with a variable-section nozzle, it is known to actuate the deployment of the movable cowl and the variation mechanism of the section of the variable nozzle by the same cylinders, the movable cowl and the variable nozzle being selectively coupled and uncoupled by a locking device.

This locking device selectively links the thrust reverser cowl and the variable nozzle in a rigid manner, the variable nozzle being free when the thrust reverser cowl is locked on the fixed structure of the thrust reverser in its direct jet position, and the variable nozzle being coupled on the cowl when the cowl is unlocked, so that the nozzle and the cowl are simultaneously driven in displacement.

In general, this type of locking device is relatively complex, it often requires an alignment of different parts to allow the coupling of the cowl and of the variable nozzle.

The large number of parts of this type of coupling device can be a source of failure and often leads to an average reliability.

SUMMARY

The present disclosure provides a thrust reverser for a nacelle of an aircraft turbojet engine comprising at least:
- a thrust reverser cowl movable in translation along a direction substantially parallel to a longitudinal axis of the nacelle, between a direct jet position and a reverse jet position;
- a variable-section outlet nozzle which is arranged in the downstream extension of said cowl and which is movable between at least one reduced-section ejection position and one increased-section ejection position;
- an actuator which comprises a body mounted on the fixed structure of the thrust reverser and an actuating rod, said rod being adapted to drive in displacement the variable nozzle and the movable cowl;
- a first device for locking the cowl in its direct jet position on the fixed structure of the thrust reverser, which comprises a locking hook pivotally mounted about a transverse axis, between a locking closed position of the cowl in which the hook cooperates with a locking pin secured to the thrust reverser cowl, and an unlocking open position of the cowl in which the hook releases said pin;
- a second device for locking the nozzle on the thrust reverser cowl, adapted to alternately occupy a locking position of the nozzle on the cowl and an unlocking position of the nozzle; and
- a reset lever which is designed to be pivotally driven by the pin, about a transverse axis, from a rest position, to a reset position, the lever being pivotally linked on the hook at least in the direction of closure of the hook, so that the pivotal driving of the lever by the pin towards its rest position drives the hook towards its locking position, characterized in that it includes an actuating arm movably mounted on the cowl between a locking position of the nozzle in which said arm actuates the second locking device to lock the nozzle on the thrust reverser cowl, and an unlocking position of the nozzle in which said arm unlocks the nozzle, said arm being driven in its locking position by the locking hook, during the pivoting of the hook towards the unlocking position thereof.

Such a thrust reverser has the advantage of being reliable, the reset lever mechanically and automatically drives the hook towards its locking position, under the effect of the push of the tappet.

In addition, the opening of the hook towards its unlocking position of the cowl automatically causes the locking of the nozzle on the cowl by the actuation of the second locking device, via the actuating arm.

Conversely, the closure of the hook towards its locking position automatically causes the unlocking of the nozzle by the release of the second locking device, via the actuating arm.

Thus, the thrust reverser according to the present disclosure allows using the force of the actuator of the cowl to unlock the locking device of the nozzle on the cowl via the hook.

According to another feature, the thrust reverser comprises an elastic return device of the arm towards the unlocking position thereof.

According to another feature, the thrust reverser comprises an elastic return device of the lever towards the reset position thereof.

According to another feature, the hook of the first locking device of the cowl is mounted on the fixed structure of the thrust reverser.

According to another feature, the thrust reverser comprises:

an elastic return device of the hook towards the unlocking position thereof; and a latch which is designed to be controlled from a blocking state of the hook, in which the latch opposes the opening of the hook, towards an unblocking state of the hook in which the latch releases the hook, the latch being automatically returned in its blocking state of the hook under the effect of an elastic return device.

Thus, the control of the latch allows unlocking the hook without any additional actuator.

According to a first form of the present disclosure, the reset lever is retractable, the reset lever and the locking hook being linked together by a ratchet-type mechanism which is adapted to pivotally couple the hook and the lever during the reset of the hook towards its locking closed position, under the action of the pin, and said mechanism being adapted to pivotally uncouple the hook and the lever during the pivoting of the hook towards the unlocking position thereof.

According to a second form of the present disclosure, the reset lever is pivotally secured to the hook, the assembly formed by the lever and the hook being elastically returned by an elastic return device towards the unlocked position of the hook.

Still according to this second form, the blocking latch of the hook has a cam track which is movably secured to the latch and which cooperates with a cam fastened on the hook, the cam track having a first blocking portion of the hook in its locking position, a second portion for retaining the hook in its unlocking position, and an intermediate third portion for guiding the hook designed to allow the pivoting of the hook when the latch is controlled in its unblocking state.

In one form, the cam fastened on the hook is adapted to cooperate with the cam track to drive the latch from its unblocking state of the hook, towards its blocking state of the hook, during the closure of the hook from its unlocking position towards its locking position.

Moreover, the present disclosure concerns a nacelle of an aircraft turbojet engine including a thrust reverser as defined hereinabove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
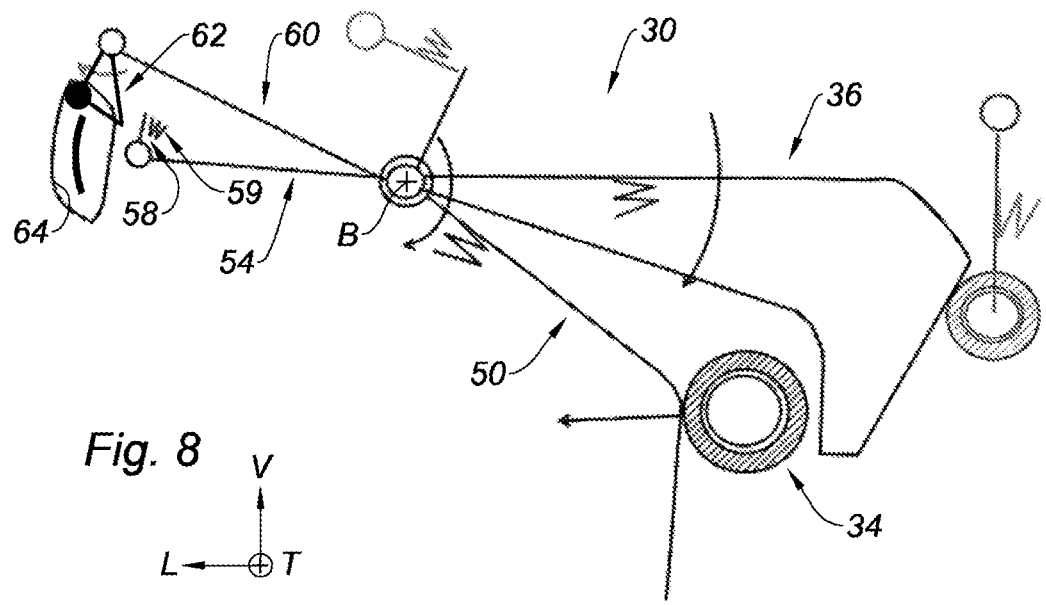
Figure 9:
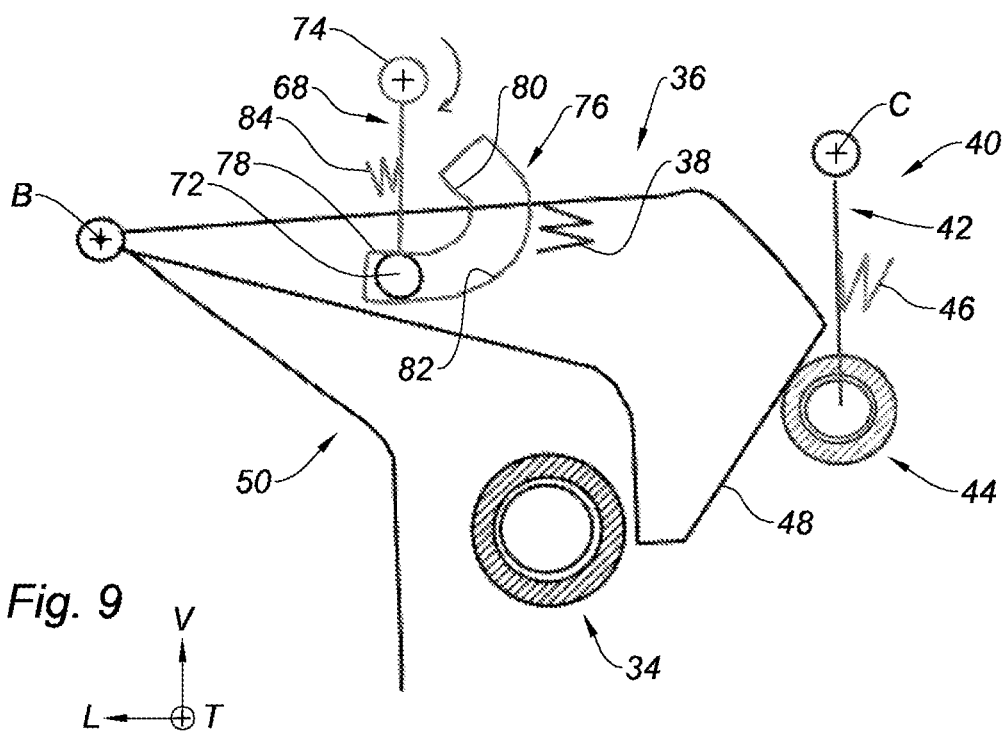
Figure 10:
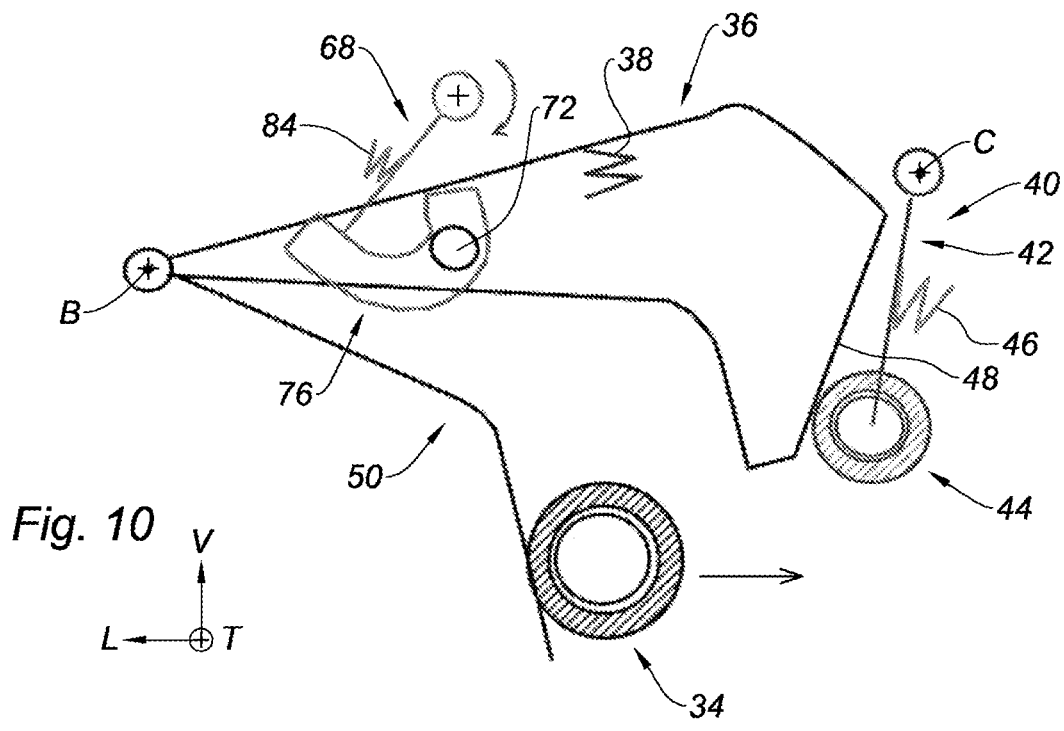
Figure 11:
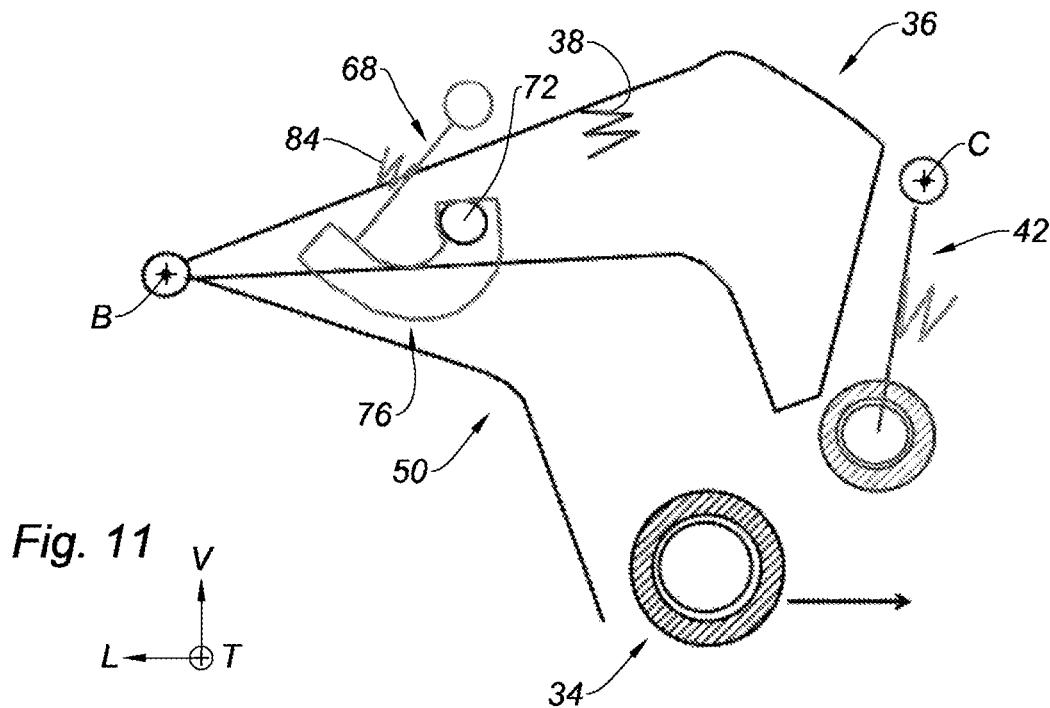

FIGS. 4 to 8 are diagrams which illustrate the kinematics of a locking device of a cowl of a thrust reverser, comprising a locking hook pivotally mounted between a locking position of the cowl and an unlocking position of the cowl, according to a first form of the present disclosure; and FIGS. 9 to 11 are diagrams which illustrate the kinematics of a locking device of a cowl of a thrust reverser, according to a second form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the expressions "upper", "lower" and their derivatives will be used without limitation with reference respectively to the upper portion and the lower portion of FIGS. 1 to 11.

In addition, in order to clarify the description and the claims, the terms longitudinal, vertical and transverse will be adopted without limitation with reference to the trihedron L, V, T indicated in the figures, whose axis L is parallel to the axis of the nacelle.

For the convenience of the description, for the different variants, the same reference numerals may be used for identical elements or functions.

Figure 1:
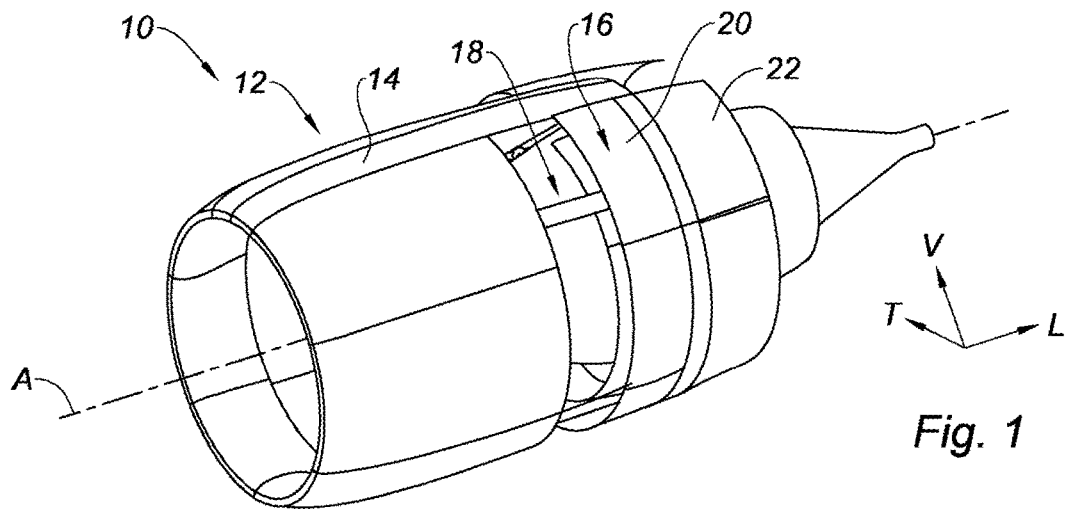
FIG. 1 is a perspective view of an aircraft nacelle equipped with a thrust reverser according to the present disclosure.

In FIG. 1 is represented a turbojet engine nacelle 10 for an aircraft, which extends axially along a longitudinal axis A.

The nacelle 10 includes a fixed front portion 12 which includes a fastening central beam 14 on the aircraft, and a movable rear portion 16.

The movable rear portion 16 includes a thrust reverser 18 which comprises a thrust reverser cowl 20 and a variable-section ejection nozzle 22 arranged in the downstream extension of the cowl 20.

Figure 2:
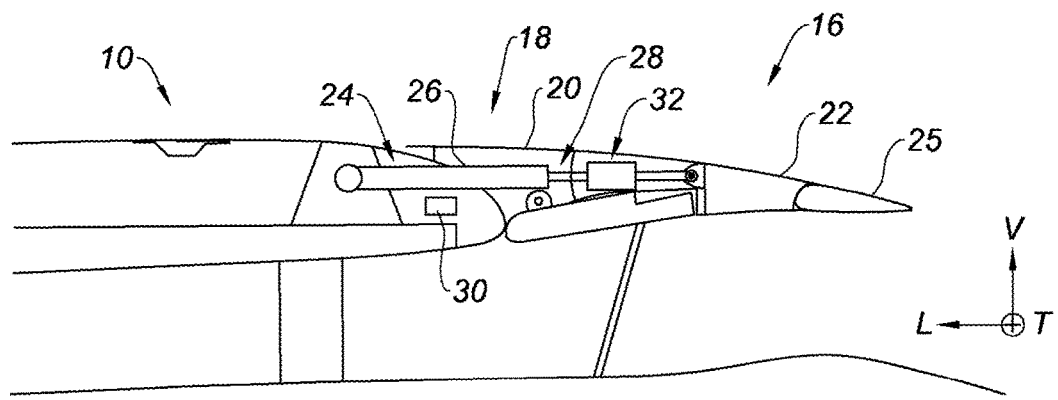
FIG. 2 is a schematic longitudinal sectional view which illustrates the thrust reverser of FIG. 1 in a direct jet position.
Figure 3:
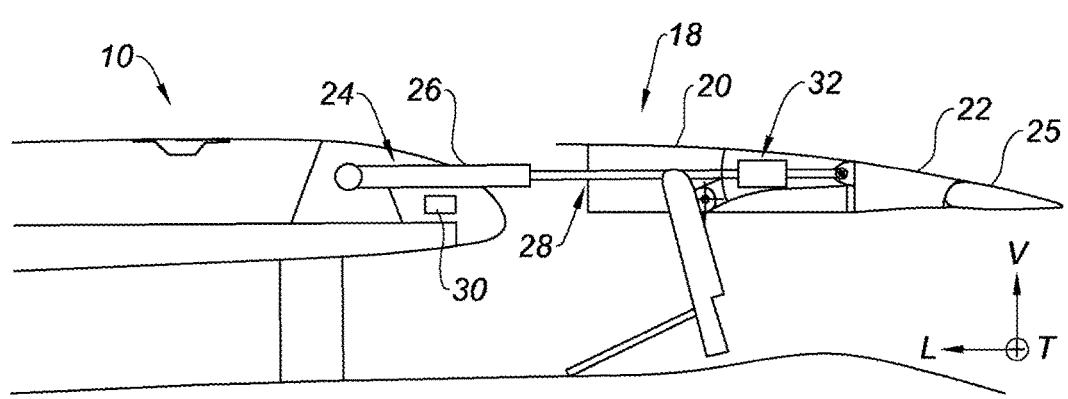
FIG. 3 is a schematic longitudinal sectional view which illustrates the thrust reverser of FIG. 1 in a reverse jet position.

The thrust reverser cowl 20 is movably mounted in translation along a direction substantially parallel to the longitudinal axis A of the nacelle 10, between a direct jet position represented in FIG. 2, in which the cowl 20 opens in the nacelle 10 a passage intended for the diverted air flow, and a reverse jet position represented in FIGS. 1 and 3 in which the cowl 20 closes this passage.

The thrust reverser 18 is equipped with means (not shown) for diverting the air flow which include for example, fixed vanes or movable vanes.

The cowl 20 is driven in displacement by means of a plurality of cylinders 24, only one of which is described in the following and represented in the figures.

The variable-section outlet nozzle 22 is movably mounted on the fixed structure of the thrust reverser 18 between at least one reduced-section ejection position, and one increased-section ejection position.

The nozzle 22 comprises a plurality of flaps 25 which are pivotally mounted on the fixed structure of the thrust reverser 18 to vary the ejection section of the nozzle 22, each of the positions of the nozzle 22 herein corresponds to a distinct inclination of the flaps 25.

To this end, the cylinder 24 includes a body 26 mounted on the fixed structure of the thrust reverser 18 and an actuating rod 28 which is adapted to selectively drive in displacement the variable nozzle 22 or the assembly constituted by the variable nozzle 22 and the movable cowl 20.

In addition, the thrust reverser 18 includes a first locking device 30 of the cowl 20 in its direct jet position on the fixed structure of the thrust reverser 18, and a second locking device 32 of the nozzle 22 on the thrust reverser cowl 20.

The first locking device 30 comprises a transverse locking pin 34 which is fastened on the cowl 20 and a locking hook 36.

Figure 4:
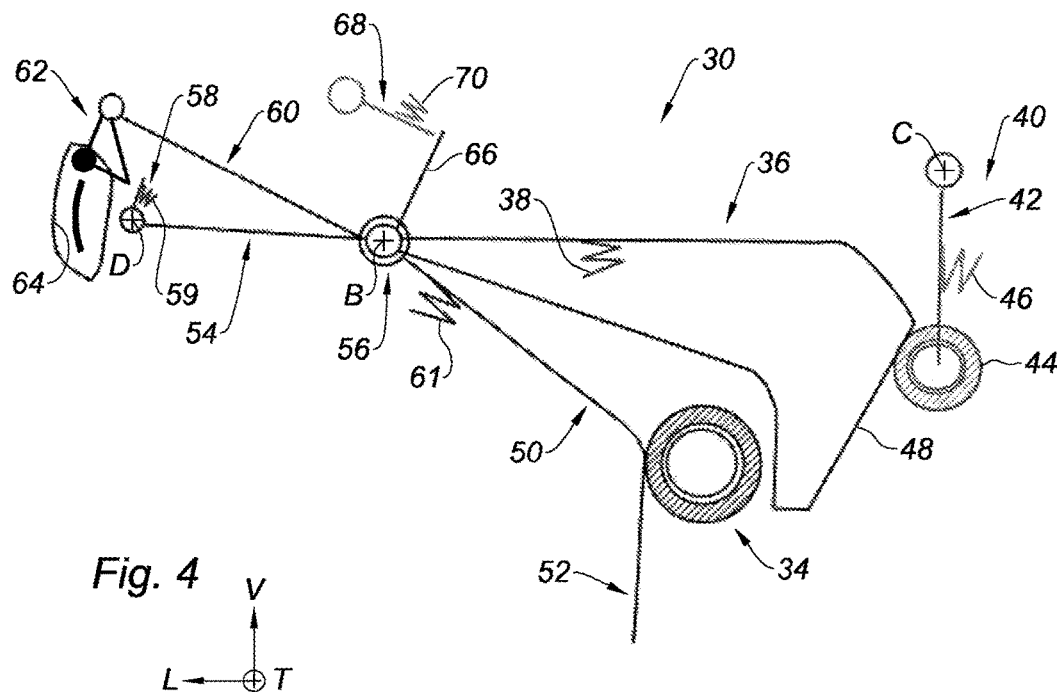
Figure 6:
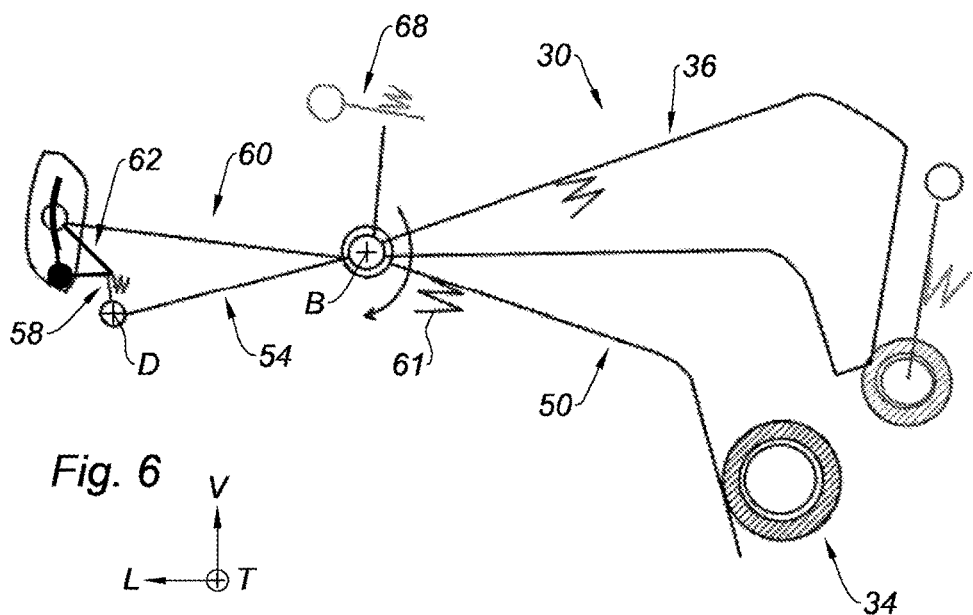
Figure 7:
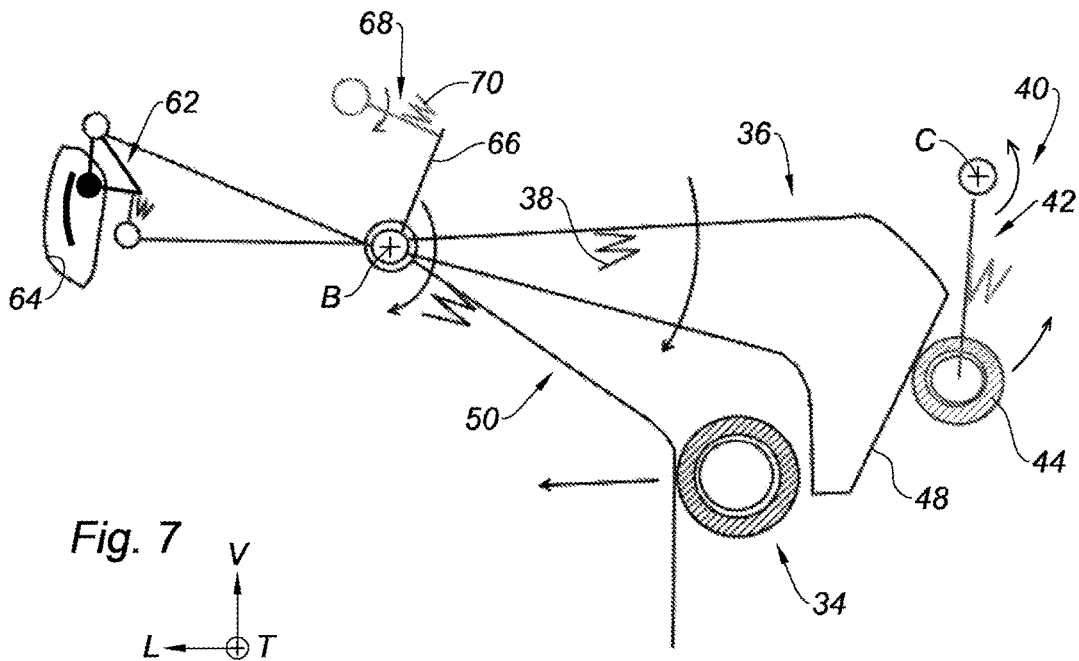

The locking hook 36 is pivotally mounted on the fixed structure of the thrust reverser 18, about a transverse axis B, between a locking closed position illustrated in FIG. 4, in which the hook 36 cooperates with the locking pin 34 to block the cowl 20 on the fixed structure of the thrust reverser 18 in its direct jet position, and an unlocking open position, illustrated in FIG. 6, in which the hook 36 releases the locking pin 34 to allow slidably driving the cowl 20 by the actuator 24 towards the reverse jet position thereof.

The hook 36 is associated to a spring 38 forming an elastic return device, which elastically returns the hook 36 towards the unlocking open position thereof.

The second device 32 for locking the nozzle 22 on the thrust reverser cowl 20 is adapted to alternately occupy a locking position of the nozzle 22 on the cowl 20 in which the nozzle is secured to the cowl 20, and an unlocking position of the nozzle 22 in which the nozzle 22 is capable of being driven between its reduced-section ejection position and its increased-section ejection position.

The second locking device 32, which is not described in more details, may be constituted by any known type of locking means, in particular a hook lock, for example.

The first locking device 30 of the cowl 20 cooperates with the second locking device 32 of the nozzle 22 via an actuation mechanism 40 of the second locking device 32.

The actuation mechanism 40 includes an actuating arm 42 which has a first end pivotally mounted about a transverse axis C on the fixed structure of the thrust reverser 18, and a second end equipped with a roller 44.

Figure 5:
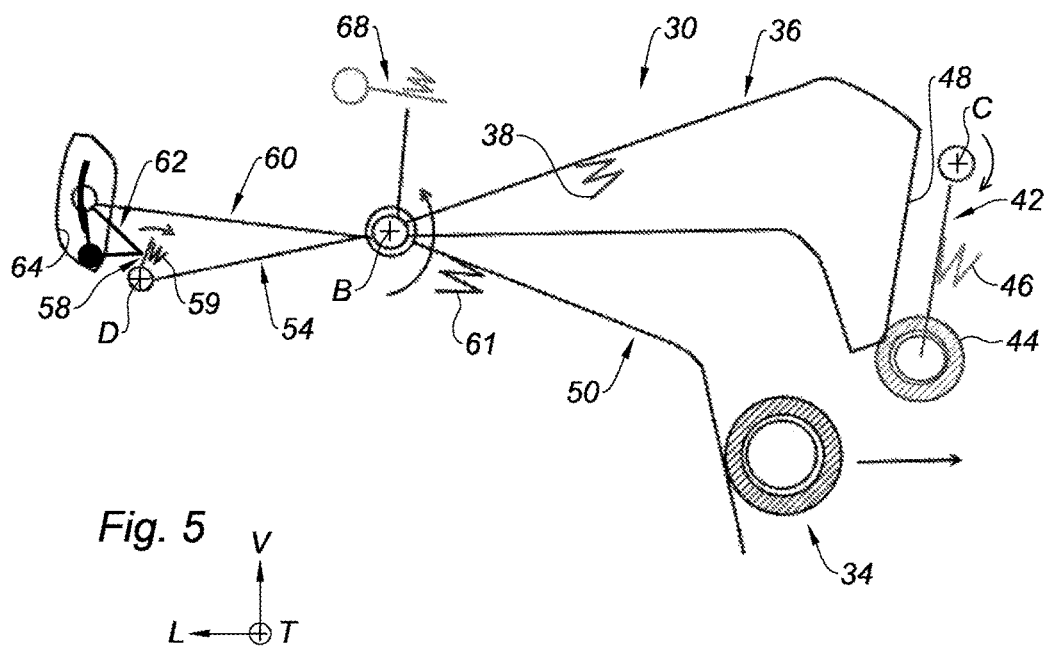

The actuating arm 42 pivots between an unlocking position, illustrated in FIG. 4, in which the second locking device 32 unlocks the nozzle 22, and a locking position, illustrated in FIG. 5, in which the arm 42 actuates the second locking device 32 to unlock the nozzle 22 on the thrust reverser cowl 20.

The arm 42 cooperates with a spring 46 forming an elastic return device, which is interposed between the arm 42 and a fixed portion of the thrust reverser 18, and which returns the arm 42 towards the locking position thereof.

For this purpose, the arm 42 is linked on the second locking device 32, by a guide rods system for example, or directly by an appropriate arrangement of the first locking device 30 of the cowl 20 with respect to the second locking device 32 of the nozzle 22.

Complementarily, the hook 36 delimits a bearing ramp 48 which cooperates with the roller 44 of the actuating arm 42, the ramp 48 and the roller 44 being arranged to drive the arm 42 towards its locking position during the opening of the hook 36 towards its unlocking position.

In other words, the opening of the hook 36 towards its unlocking position of the cowl 20 automatically causes the locking of the nozzle 22 on the cowl 20 by the actuation of the second locking device 32, via the actuating arm 42.

Conversely, the closure of the hook 36 towards its locking position automatically causes the unlocking of the nozzle 22 by the release of the second locking device 32, via the actuating arm 42.

According to another aspect, the thrust reverser 18 includes a tappet 34 and a lever 50 for resetting the hook 36.

The tappet 34 herein is constituted by the locking pin 34, the tappet 34 is therefore called pin 34 in the following. The pin 34 is in the form of a transverse roll which is movably secured to the thrust reverser cowl 20 and which is arranged opposite to the lever 50.

According to a first form of the present disclosure, represented in FIGS. 4 to 8, the reset lever 50 is retractable, the reset lever 50 and the locking hook 36 being linked together by a mechanism which is adapted to pivotally couple the hook 36 and the lever 50 during the reset of the hook 36 towards its locking closed position, under the action of the pin 34, and the mechanism being adapted to pivotally uncouple the hook 36 and the lever 50 during the pivoting of the hook 36 towards its unlocking position.

More particularly, the reset lever 50 has a bearing section 52 adapted to cooperate with the pin 34 forming a tappet, a locking section 54, and an intermediate pivot section 56 which is pivotally mounted about the transverse pivot axis B of the hook 36.

The locking section 54 of the lever 50 includes a ratchet 58 which is pivotally mounted about a transverse axis D and which is associated to a return spring 59.

Besides, the lever 50 is pivotally mounted about the pivot axis B of the hook 36, between an initial position illustrated in FIG. 4, and a reset position illustrated in FIG. 6, in which the lever is capable of driving the hook 36 towards its unlocking position.

The lever 50 is elastically returned towards its reset position by a spring 61.

Complementarily, the hook 36 is pivotally secured to an arm 60 which is pivotally mounted about the pivot axis B of the hook 36, between a top position in FIG. 4, corresponding to the locking position of the hook 36, and a low position illustrated in FIG. 6, corresponding to the unlocking position of the hook 36.

The arm 60 carries at its free end a cam 62 which is mounted in free pivoting on the arm 60 and which is guided by a cam track 64, secured to the fixed structure of the thrust reverser 18, during the pivoting of the arm 60, from a rest position, to a reset position illustrated in FIG. 5, in which the cam 62 is capable of opposing the ratchet 58 to movably link the lever 50 on the hook 36.

In addition, the hook 36 includes a locking pin 66 which extends from the hook 36 in the vicinity of its pivot axis B, and which cooperates with a controlled latch 68.

The latch 68 is pivotally mounted on the fixed structure of the thrust reverser 18, between a blocking state represented in FIG. 4, in which the latch 68 opposes the pin 66 to pivotally block the hook 36, and a retracted position represented in FIG. 5, in which the latch 68 releases the hook 36.

Advantageously, the latch 68 is elastically returned towards its blocking state of the hook 36 by a spring 70 forming an elastic return device.

Besides, the passage of the latch 68 in the unlocking position is made via an actuator (not shown).

With reference to FIGS. 4 to 8, the operation of the present disclosure according to the first form is described hereinafter in chronological order.

FIG. 4 illustrates the hook 36 in its locking position of the cowl 20.

To unlock the hook 36, the latch 68 is controlled in its blocking state to release the hook 36.

In a first step, the hook 36 is automatically driven from its locking position of the cowl 20, up to its unlocking position, under the action of the return spring 38.

Referring to FIG. 5, during the opening of the hook 36, the ramp 48 of the hook 36 releases the roller 44 from the arm 42 of the actuation mechanism 40, the arm 42 therefore being driven towards its locking position by elastic return of the associated spring 46, in which position the arm 42 actuates the second locking device 32 to lock the nozzle 22 on the thrust reverser cowl 20.

Simultaneously, still during the opening of the hook 36, the arm 60, secured to the hook 36, drives the cam 62 down to its low reset position illustrated in FIG. 5.

In a second step, subsequently to the opening of the hook 36 and to the beginning of the deployment of the cowl 20 driven by the actuator 24, the locking pin 34, or tappet, is driven in longitudinal displacement by the cowl 20, rearwardly of the nacelle 10, as shown in FIG. 5.

The removal of the pin 34 releases the lever 50 which is elastically returned by the associated spring 61, towards its reset position, reached in FIG. 6.

The pivoting of the lever 50 drives the ratchet 58 in displacement, during which displacement the ratchet 58 moves aside upon contact with the cam 62 provided to this end, against the associated spring 59, before being engaged by elastic return below the cam 62, so as to movably link the lever 20 on the hook 36, as shown in FIG. 6.

In a third step, during the closure of the cowl 20, the cowl 20 is driven forwardly of its direct jet position, the pin 34, or tappet, linked to the cowl 20 pushes the lever 50 longitudinally, the lever 50 pivots against the associated spring 61, towards its initial position.

During its pivoting, the lever 50 pivotally drives the hook 36 towards its locking position, via the ratchet 58 and the cam 62.

During the closure of the hook 36, the ramp 48 of the hook 36 pushes the roller 44 against the associated spring 46, the arm 42 therefore being driven towards its unlocking position in which the second locking device 32 unlocks the nozzle 22.

Besides, the pivoting of the hook 36 drives the locking pin 66 beyond a position allowing the latch to pass into its blocking state via the spring 70.

Referring to FIG. 8, the pin 34, or tappet, pushes the lever 50 into over-travel, so that the cam 62, guided by the cam track 64, reaches its rest position, the cam 62 releasing the ratchet 58.

At the end of travel of the hook 36 and of the lever 50, according to FIG. 4, the cam 62, guided by the cam track 64, gets its rest position back and releases the ratchet 58, the hook 36 gets its initial locking position of the cowl 20 back and the lever 50 gets its initial position back.

According to a second form of the present disclosure, represented in FIGS. 9 to 11, and described hereinafter, the reset lever 50 is not retractable.

More particularly, unlike the previously described first locking device 30, the lever 50 of the first locking device 30 according to the second form is pivotally secured to the hook 36, the lever 50 and the hook 36 being pivotally mounted on the fixed structure of the thrust reverser 18 about the transverse pivot axis B.

Besides, the assembly formed by the lever 50 and the hook 36 is elastically returned towards the unlocking position of the hook 36 illustrated in FIG. 10, by the spring 38 forming an elastic return device.

According to this second form, the hook 36 includes a transverse cam 72 which cooperates with the latch 68.

The latch 68 has a first end 74 pivotally mounted on the fixed structure of the thrust reverser 18, about a transverse axis, and a second end forming a cam track 76 which is designed to cooperate with the cam 72 of the hook 36.

The cam track 76 has a first blocking portion 78 of the hook 36, a second retaining portion 80, and an intermediate third guide portion 82.

The blocking portion 78 of the cam track 76 bears vertically on the cam 72 of the hook 36 to oppose the pivoting of the hook 36, when the latch 68 occupies a blocking state.

The guide portion 82, cooperates with the cam 72 of the hook 36, in particular to pivotally drive the hook 36, when the latch 68 is driven towards its unblocking state.

Besides, the retaining portion 80 of the cam track 76 is adapted to bear longitudinally on the cam 72 of the hook 36, when the hook 36 occupies its unlocking open position, so that the latch 68 is held in balance in its unblocking state represented in FIG. 11.

In addition, the latch 68 is associated to an actuator (not shown) which, when controlled, allows driving the latch 68 pivotally between a blocking state of the hook 36 represented in FIG. 9 and an unblocking state represented in FIG. 11.

Besides, the latch 68 is elastically returned in its blocking state of the hook 36, by a spring 70.

The actuation mechanism 40, identical to that previously described for the first form of the present disclosure, includes an actuating arm 42 which has a first end pivotally mounted about a transverse axis C on the fixed structure of the thrust reverser 18, and a second end equipped with a roller 44.

Similarly, the locking pin 34 forms a tappet which is movably secured to the thrust reverser cowl 20.

Referring to FIGS. 9 to 11, the operation of the present disclosure according to the second form is described hereinafter in chronological order Referring to FIG. 9, in a first step, the latch 68 is pivotally driven in its blocking state of the hook 36, under the action of the associated actuator (not shown).

The blocking portion 78 of the cam track 76 no longer opposes the hook 36, so that the hook 36 is pivotally driven towards its unlocking position under the effect of its return spring 38 and of the cam track 76.

Referring to FIG. 10, during the opening of the hook 36, the ramp 48 of the hook 36 releases the roller 44 from the arm 42 of the actuation mechanism 40, the arm 42 being therefore driven towards its locking position by elastic return of the associated spring 46, in which position the arm 42 actuates the second locking device 32 to lock the nozzle 22 on the thrust reverser cowl 20.

Simultaneously, still during the opening of the hook 36, the hook 36 is held in position by the tappet pin 34 which still cooperates with the lever 50.

Similarly, still in this intermediate position illustrated in FIG. 10, the latch 68 is still pivotally driven towards its unblocking position by its actuator.

In a second step, subsequently to the beginning of the deployment of the cowl 20 by the associated actuator 24, the locking pin 34, or tappet, is driven in longitudinal displacement by the cowl 20, rearwardly of the nacelle 10, as shown in FIGS. 10 and 11.

The removal of the pin 34 ends by releasing the lever 50 which is elastically returned by the associated spring 38, towards its reset position, reached in FIG. 11.

When the hook 36 occupies its unlocking position, according to FIG. 11, the latch 68 occupies its unblocking state and the retaining portion 80 of the cam track 76 bears longitudinally on the cam 72 of the hook 36, so that the latch 68 is in balance in its unblocking state, the actuator associated to the latch 68 is therefore no longer operative.

In a third step, to lock the hook 36 again, the tappet pin 34 pushes on the lever 50 forwards, the lever 50 pivotally driving the hook 36 towards its initial locking position.

During the closure of the hook 36, the latch 68 is driven to its blocking position of the hook 36 under the effect of its return spring 70, in order to pivotally block the hook 36 in its locking position of the cowl 20, illustrated in FIG. 9.

Similarly, during the closure of the hook 36, the ramp 48 of the hook 36 pushes the roller 44 against the associated spring 46, the arm 42 being therefore driven towards its unlocking position in which the second locking device 32 unlocks the nozzle 22.

The present description of the present disclosure is given as a non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a nacelle of an aircraft turbojet engine, the thrust reverser comprising:
   a thrust reverser cowl movable in translation along a direction substantially parallel to a longitudinal axis (A) of the nacelle between a direct jet position and a reverse jet position;
   a variable-section outlet nozzle arranged in a downstream extension of said thrust reverser cowl and movable between at least one reduced-section ejection position and one increased-section ejection position;
   an actuator comprising a body mounted on a fixed structure of the thrust reverser and an actuating rod, said actuating rod being adapted to drive the variable-section outlet nozzle and the movable thrust reverser cowl in displacement;
   a first device for locking the thrust reverser cowl in the direct jet position on the fixed structure of the thrust reverser, the first locking device comprising a locking hook pivotally mounted about a transverse axis (B), between a closed cowl locking position in which the locking hook cooperates with a locking pin secured to the thrust reverser cowl, and an unlocking open position of the thrust reverser cowl in which the locking hook releases said locking pin;
   a second device for locking the variable-section outlet nozzle on the thrust reverser cowl, the second locking device adapted to alternately occupy a position of locking the variable-section outlet nozzle on the cowl and a position of unlocking the variable-section outlet nozzle; and
   a reset lever pivotally driven by the locking pin about a transverse axis (B) from a rest position to a reset position, the reset lever being pivotally linked on the locking hook in a direction of closure of the locking hook, such that pivotal driving of the reset lever by the locking pin towards the rest position drives the locking hook towards the locking position,
   wherein the reset lever includes an actuating arm movably mounted on the thrust reverser cowl between the locking position of the variable-section outlet nozzle in which said arm actuates the second locking device to lock the variable-section outlet nozzle on the thrust reverser cowl, and the unlocking position of the variable-section outlet nozzle in which said arm unlocks the nozzle, said arm being driven in the locking position by the locking hook during pivoting of the locking hook towards the unlocking position.

2. The thrust reverser according to claim 1 further comprising an elastic return device operable to return the actuating arm towards the locking position.

3. The thrust reverser according to claim 2, wherein the elastic return device is operable to return the reset lever towards the reset position.

4. The thrust reverser according to claim 1, wherein the locking hook of the first locking device of the thrust reverser cowl is mounted on the fixed structure of the thrust reverser.

5. The thrust reverser according to claim 1 further comprising:
   an elastic return device operable to return the locking hook towards the unlocking position; and
   a latch operable to be controlled from a blocking state of the locking hook, in which the latch opposes opening of the hook, towards an unblocking state of the locking hook in which the latch releases the locking hook, wherein the latch automatically returns to the blocking state of the locking hook under an effect of the elastic return device.

6. The thrust reverser according to claim 1, wherein the reset lever is retractable, wherein the reset lever and the locking hook being linked together by a ratchet-type mechanism adapted to pivotally couple the locking hook and the reset lever during reset of the locking hook towards the locking closed position under action of the locking pin, said ratchet-type mechanism being adapted to pivotally uncouple the locking hook and the reset lever during pivoting of the locking hook towards the unlocking position.

7. The thrust reverser according to claim 5, wherein the reset lever is pivotally secured to the locking hook forming an assembly, the assembly being elastically returned by the elastic return device towards the unlocked position of the locking hook.

8. The thrust reverser according to claim 5, wherein the blocking latch of the hook has a cam track movably secured to the latch and cooperates with a cam fastened on the locking hook, the cam track having a first blocking portion of the locking hook in the locking position, a second retaining portion of the locking hook in the unlocking position, and an intermediate third portion for guiding the locking hook to allow pivoting of the locking hook when the latch is controlled in the unblocking state.

9. The thrust reverser according to claim 8, wherein the cam fastened on the locking hook is adapted to cooperate with the cam track to drive the latch from the unblocking state of the locking hook, towards its blocking state of the locking hook, during closure of the locking hook from the unlocking position towards the locking position.

10. A nacelle of an aircraft turbojet engine comprising a thrust reverser according to claim 1.

* * * * *